(12) United States Patent
England, III

(10) Patent No.: US 7,551,771 B2
(45) Date of Patent: Jun. 23, 2009

(54) METHODS, SYSTEMS, AND COMPUTER PROGRAM PRODUCTS FOR ACQUIRING THREE-DIMENSIONAL RANGE INFORMATION

(75) Inventor: James N. England, III, Chapel Hill, NC (US)

(73) Assignee: Deltasphere, Inc., Durham, NC (US)

( * ) Notice: Subject to any disclaimer, the term of this patent is extended or adjusted under 35 U.S.C. 154(b) by 140 days.

(21) Appl. No.: 11/523,292

(22) Filed: Sep. 19, 2006

(65) Prior Publication Data

US 2007/0064976 A1    Mar. 22, 2007

Related U.S. Application Data

(60) Provisional application No. 60/718,646, filed on Sep. 20, 2005, provisional application No. 60/721,328, filed on Sep. 28, 2005.

(51) Int. Cl.
    *G06K 9/20* (2006.01)
(52) U.S. Cl. ........................................ 382/154; 382/299
(58) Field of Classification Search ................ 382/106, 382/154, 284, 298, 299; 356/3, 3.13, 3.14, 356/4.01; 348/142
See application file for complete search history.

(56) References Cited

U.S. PATENT DOCUMENTS

| | | | |
|---|---|---|---|
| 5,309,212 A | 5/1994 | Clark ............................ 356/5 |
| 5,577,130 A | 11/1996 | Wu ............................ 382/106 |
| 5,715,166 A | 2/1998 | Besl et al. ............. 364/474.24 |
| 5,734,384 A | 3/1998 | Yanof et al. ................. 345/424 |
| 5,878,152 A | 3/1999 | Sussman ..................... 382/106 |
| 5,988,862 A | 11/1999 | Kacyra et al. ............... 364/578 |
| 6,083,162 A | 7/2000 | Vining ........................ 600/407 |
| 6,246,468 B1 | 6/2001 | Dimsdale ................... 356/4.02 |
| 6,246,898 B1 | 6/2001 | Vesely et al. ................ 600/424 |
| 6,346,940 B1 | 2/2002 | Fukunaga ................... 345/427 |
| 6,483,950 B1 | 11/2002 | Wallack ...................... 382/285 |
| 6,590,640 B1 | 7/2003 | Aiken et al. ............... 356/3.01 |

(Continued)

OTHER PUBLICATIONS

Ellekilde et al., "Fusing Range and Intensity Images for Generating Dense Models of Three-Dimensional Environments," Proceedings of the 2006 IEE International Conference on Man-Machine Systems (Sep. 2006).

(Continued)

*Primary Examiner*—Andrew W Johns
(74) *Attorney, Agent, or Firm*—Jenkins, Wilson, Taylor & Hunt, P.A.

(57) ABSTRACT

Methods, systems, and computer program products for acquiring three-dimensional range information are disclosed. According to one aspect, acquiring three-dimensional range information of a scene includes obtaining multiple pixel-shifted images of a scene, where at least one of the images being shifted by a non-integer pixel value with respect to another of the images. Obtaining each of the pixel-shifted images includes generating electromagnetic radiation that is reflected from target objects in the scene about which range information is desired. The reflected electromagnetic radiation is collected using a sensor array of at least two dimensions, where an array of pixels is captured simultaneously. A data value is determined for each captured pixel based on analysis of the collected electromagnetic radiation, by combining the data values from the pixel-shifted images to create a super-resolution image of the scene, and by analyzing the data values of the super-resolution image to determine a three-dimensional location for each pixel of the super-resolution image.

108 Claims, 5 Drawing Sheets

U.S. PATENT DOCUMENTS

| | | | |
|---|---|---|---|
| 6,628,279 B1 | 9/2003 | Schell et al. | 345/420 |
| 6,704,099 B2 | 3/2004 | Uomori et al. | 356/4.01 |
| 6,915,008 B2 | 7/2005 | Barman et al. | 382/154 |
| 6,922,234 B2 | 7/2005 | Hoffman et al. | 356/141.1 |
| 6,970,591 B1 | 11/2005 | Lyons et al. | 382/154 |
| 6,980,690 B1 | 12/2005 | Taylor et al. | 382/154 |
| 6,992,685 B2 | 1/2006 | Hallbauer et al. | 345/619 |
| 7,177,486 B2 | 2/2007 | Stewart et al. | 382/294 |
| 7,206,462 B1 | 4/2007 | Betke et al. | 382/280 |
| 7,215,430 B2 | 5/2007 | Kacyra et al. | 356/601 |
| 7,403,268 B2 | 7/2008 | England et al. | 356/4.01 |
| 2005/0028111 A1 | 2/2005 | Schrag et al. | 715/851 |
| 2005/0280714 A1 | 12/2005 | Freeman | 348/219.1 |
| 2006/0115133 A1 | 6/2006 | Potter et al. | 382/128 |
| 2006/0181527 A1 | 8/2006 | England et al. | 345/419 |
| 2006/0182314 A1 | 8/2006 | England et al. | 382/106 |
| 2006/0193521 A1 | 8/2006 | England et al. | 382/190 |
| 2006/0244746 A1 | 11/2006 | England et al. | 345/419 |

OTHER PUBLICATIONS

Kil et al., "Laser Scanner Super-resolution," Eurographics Symposium on Point-Based Graphics (Jul. 29-30, 2006).

Oggier et al., "SwissRanger SR3000 and First Experiences based on Miniaturized 3D-TOF Cameras," Proceedings of the 1$^{st}$ Range Imaging Research Day at ETH Zurich, Switzerland (Sep. 8-9, 2005).

Stone et al., "Performance Analysis of Next-Generation LADAR for Manufacturing, Construction, and Mobility," National Institutes of Standards and Technology NISTIR 7117 (May 2004).

Gokturk et al., "A Time-of-Flight Depth Sensor—System Description, Issues and Solutions," IEEE Conference on Computer Vision and Pattern Recognition Workshop (2004).

Park et al., "Super-Resolution Image Reconstruction: A Technical Overview," IEEE Signal Processing Magazine (May 2003).

Notification of Transmittal of the International Search Report and the Written Opinion of the International Searching Authority, or the Declaration for International Application No. PCT/US06/36459 (Oct. 23, 2007).

Notice of Allowance and Fee(s) Due in U.S. Appl. No. 11/351,246 (Sep. 4, 2008).

Non-Final Official Action in U.S. Appl. No. 11/351,234 (Apr. 29, 2008).

Notice of Allowance and Fee(s) Due in U.S. Appl. No. 11/351,235 (Mar. 31, 2008).

Non-Final Official Action in U.S. Appl. No. 11/351,248 (Jan. 23, 2008).

Non-Final Official Action in U.S. Appl. No. 11/351,246 (Jan. 22, 2008).

Non-Final Official Action in U.S. Appl. No. 11/351,235 (Nov. 6, 2007).

Leica Geosystems, "Leica Cyclone 5.4 Technical Specifications," Product Literature, http://www.leica-geosystems.com/hds/en/Cyclone_5.4_Technical_Specifications.pdf (Mar. 15, 2006).

3RDTECH Inc., "SceneVision-3D Functions," Product Literature, http://www.deltasphere.com/scenevision_specs.htm (Feb. 28, 2006).

Canesta Inc., "CanestaVision Chips," http://www.canesta.com/html/sensors.htm (2006).

Acuity Research, "Accurange Line Scanner," Product Literature, http://www.acuityresearch.com/pdf/line-scanner-data-sheet.pdf (Oct. 17, 2005).

Acuity Research, "AccuRange 4000 laser rangefinder," Product Literature, http://www.acuityresearch.com/pdf/ar4000-data-sheet.pdf (Feb. 10, 2005).

3RDTECH Inc, "Revolutionary 3D Scene Capture, Viewing and Analysis," Product Literature, http://www.deltasphere.com/images/deltaspheredatasheet_112204s.pdf (Nov. 22, 2004).

Gokturk et al., "A Time-of-Flight Depth Sensor—System Description, Issues and Solutions," 2004 Conference on Computer Vision and Pattern Recognition Workshop (CVPRW'04), vol. 3.

Canesta Inc., "Development Platform DP100" (Jun. 26, 2003).

Innovmetric Inc., "PolyWorks Total Point Cloud Inspection and Reverse-Engineering Software Solution," Product Literature, http://www.innovmetric.com/Manufacturing/pdf/brochureWeb.pdf (2003).

Bernardini et al., "The 3D Model Acquisition Pipeline," vol. 21, No. 2, pp. 149-172, Computer D Graphics Forum (2002).

Nyland et al., "Capturing, Processing and Rendering Real-World Scenes," Videometrics and Optical Methods for 3D Shape Measurement, Electronic Imaging 2001, Photonics West, SPIE vol. 4309 (Jan. 22, 2001).

3RDTECH Inc, "DeltaSphere 3000 Laser 3D Scene Digitizer," Product Literature (Jun. 22, 2000).

Acuity Research, "AccuRange 4000, Accurange High Speed Interface, Accurange Line Scanner User's Manual," Product Manual, Menlo Park, California (Dec. 15, 1999).

Han et al., "Feature Recognition from CAD Models," IEEE Computer Graphics and Applications, pp. 80-94 (Mar./Apr. 1998).

Jensen et al., "Subpixel Edge Localization and the Interpolation of Still Images," IEEE Transactions on Image Processing, vol. 4, No. 3, pp. 285-295 (Mar. 1995).

Turk et al., "Zippered Polygon Meshes from Range Images," Computer Graphics, ACM SIGGRAPH 94 Proceedings, Orlando, Fla., pp. 311-318 (1994).

Besl et al., "A Method for Registration of 3-D Shapes," IEEE Transactions on Pattern Analysis and Machine Intelligence, vol. 14, No. 2, pp. 239-256 (1992).

Arun et al., "Least-Squares Fitting of Two 3D Point Sets," IEEE Transactions on Pattern Analysis and Machine Intelligence, vol. 9, pp. 698-700 (1987).

Faugeras et al., "The Representation, Recognition, and Locating of 3-d Objects," International Journal of Robotic Research, vol. 5, No. 3, pp. 27-52 (Fall 1986).

Tsai, "An Efficient and Accurate Camera Calibration Technique for 3D Machine Vision," Proceedings of IEEE Conference on Computer Vision and Pattern Recognition, Miami Beach, FL, pp. 364-374 (1986).

Notice of Allowance and Fee(s) Due in U.S. Appl. No. 11/351,248 (Sep. 29, 2008).

METHODS, SYSTEMS, AND COMPUTER PROGRAM PRODUCTS FOR ACQUIRING THREE-DIMENSIONAL RANGE INFORMATION

RELATED APPLICATIONS

This application claims the benefit of U.S. Provisional Patent Application Ser. No. 60/718,646, filed Sep. 20, 2005, and U.S. Provisional Patent Application Ser. No. 60/721,328, filed Sep. 28, 2005; the disclosure of each of which is incorporated herein by reference in its entirety.

TECHNICAL FIELD

The subject matter described herein relates to three-dimensional range-finding cameras. More particularly, the subject matter described herein relates to methods, systems, and computer program products for acquiring three-dimensional range information.

BACKGROUND

A range camera is an imaging device that can determine the distance from the camera, or range, for each pixel in the captured image. The two-dimensional (2D) pixel coordinates in a captured image along with the measured range at the pixel coordinates determine the three-dimensional (3D) coordinates of a target point in space in relation to the range camera. The resulting data can provide 3D information about targets (objects or scenes) within the image. The information associated with a pixel may correspond to parameters other than range, such as color, temperature, and reflectivity, for example. Thus, the two-dimensional pixel coordinates in a captured image can be associated with multiple parameters that provide information about a scene.

Scanning laser rangefinder type range cameras acquire range to each pixel by measuring time-of-flight of a single laser beam that is scanned over each pixel location in a scene. Typically, the laser beam is mechanically steered in each pixel's direction using rotating elevation mirror and azimuth assemblies. There are disadvantages to the scanning laser rangefinder design, including mechanical complexity (e.g., they typically use spinning mirrors and rotating mounts, which require motors that must be precisely controlled); increased costs and reduced reliability inevitably associated with mechanical design complexity; and relatively long scan times.

Image capture type range cameras capture image data as an array of pixels simultaneously, but known range cameras using this approach suffer disadvantages, such as limited spatial resolution and limited range accuracy, both of which constrain the use of the range data to only those types of imaging and object recognition applications that can accept relatively coarse image and range data, such as robot vision, automatic door openers, or automobile occupancy detectors. One difficulty in using an image capture type range camera for high resolution is that, in addition to increased cost of the higher-resolution sensor array, a higher resolution image requires a smaller pixel dimension, whether it be physically smaller or effectively smaller as a result of optical magnification, and a smaller pixel dimension requires more illumination of the scene to obtain an accurate range reading. There are both practical limits on the amount of illumination that can be provided and safety limits which limit the amount of illumination allowed, thereby avoiding eye damage to those in proximity to the range camera, such as users and bystanders. Laser rangefinders may mitigate the safety issue by generating a pulse of laser light with high peak power but low total energy—a technique that may not give good accuracy results when used with image capture type range cameras, however.

There are a number of important applications for range cameras which, due to the higher data quality or range accuracy requirements, are not being addressed by current range camera technology. Such applications include forensics (e.g., documenting the geometric relationships within a crime scene), construction (e.g., capturing "as built" dimensions of spaces and equipment), security (e.g., creating 3D models for emergency response planning), and entertainment (e.g., creating 3D models for video games or motion picture special effects), to name a few. There are undoubtedly many other possible applications to which a range camera could be applied or adapted but for the relatively high cost of the equipment. Therefore, an unmet need exists for improving the quality of range data obtained from range cameras. Further, an unmet need exists for providing lower cost range cameras useful for rangefinder applications.

Due to the unique nature of a range camera—the ability to record 3D range information of a scene—a user of a range camera may desire to obtain 3D information about an entire room, including not only the three hundred and sixty degree image of the walls but also the areas above and below the camera: the ceiling and floor, respectively. Thus, a range camera should be able to take an unobstructed view of an entire volume. Unfortunately, when using a traditional tilt-and-swivel mount, in which the tilt axis and swivel axis geometrically intersect, the mount itself may obstruct the camera's view of some portion of the scene: the floor, if the mount is atop a pedestal, the ceiling, if the mount is suspended, and so on. Because of this limitation, it may become necessary to obtain image data from two different positions, and perform registration on the collected images. This may require extensive processing time and capability and may introduce additional range errors. Therefore, an unmet need exists for providing a range camera that incorporates a swivel mount that allows the range camera to have an unobstructed view of the entire volume of the scene for which range information is to be collected.

Accordingly, in light of the disadvantages associated with existing laser rangefinders and range cameras, there exists a need for a lower cost range camera with improved range accuracy and spatial resolution and which can obtain range data for an entire volume without obstruction.

SUMMARY

According to one aspect, the subject matter described herein includes a method for acquiring three-dimensional range information of a scene. The method includes obtaining multiple pixel-shifted images of a scene, where at least one of the images is shifted by a non-integer pixel value with respect to another of the images. Obtaining each of the pixel-shifted images includes generating electromagnetic radiation that is reflected from target objects in the scene about which range information is desired. The reflected electromagnetic radiation is collected using a sensor array of at least two dimensions. An array of pixels is captured simultaneously by the sensor array to create an image. A data value is determined for each captured pixel by analyzing the collected electromagnetic radiation, by combining the data values from the pixel-shifted images to create a super-resolution image of the scene, and by analyzing the data values of the super-resolution image to determine a three-dimensional location for each pixel of the super-resolution image.

According to another aspect, the subject matter described herein includes a method for acquiring three-dimensional range information of a scene. The method includes in a range camera, generating electromagnetic radiation that is reflected from target objects in the scene about which range information is desired. A sensor array of at least two dimensions collects images of the reflected electromagnetic radiation as an array of simultaneously captured pixels. A data value is determined for each captured pixel by analyzing the collected electromagnetic radiation. A three-dimensional location is determined for each captured pixel based on analysis of the data value of each captured pixel. The data value of the captured pixel, its calculated three-dimensional location, or both, is stored in a storage device integrated into the range camera.

According to another aspect, the subject matter described herein includes a method for acquiring three-dimensional range information of a scene. The method includes in a range camera, generating electromagnetic radiation that is reflected from target objects in the scene about which range information is desired. A sensor array of at least two dimensions collects images of the reflected electromagnetic radiation as an array of simultaneously captured pixels. A data value is determined for each captured pixel by analyzing the collected electromagnetic radiation, and by applying geometric and radiometric corrections to the data value. A three-dimensional location is determined for each captured pixel based on analysis of the data value of the captured pixels.

According to another aspect, the subject matter described herein includes a method for acquiring three-dimensional range information of a scene. The method includes in a range camera, generating electromagnetic radiation that is reflected from target objects in the scene about which range information is desired. A sensor array of at least two dimensions collects images of the reflected electromagnetic radiation as an array of simultaneously captured pixels. A data value is determined for each captured pixel by analyzing the collected electromagnetic radiation, and by applying a noise reduction algorithm to the data values for each captured pixel to reduce errors introduced by noise. A three-dimensional location is determined for each captured pixel based on analysis of the data value of the captured pixels.

According to another aspect, the subject matter described herein includes a method for acquiring color and three-dimensional range information of a scene. The method includes in a range camera, generating electromagnetic radiation that is reflected from target objects in the scene about which range information is desired. A range sensor array of at least two dimensions collects images of the reflected electromagnetic radiation as an array of simultaneously captured range pixels. A color sensor array of at least two dimensions collects images of the scene as an array of simultaneously captured color pixels. A three-dimensional location is determined for each captured range pixel based on analysis of the captured range pixels. A color data value is determined for each captured color pixel based on analysis of the captured color pixels.

According to another aspect, the subject matter described herein includes a method for acquiring three-dimensional range information of a scene. The method includes obtaining multiple images of a scene, where at least one image is taken using a different azimuth, elevation, or both. Obtaining each image includes generating electromagnetic radiation that is reflected from target objects in the scene about which range information is desired, collecting into a sensor array of at least two dimensions an image of the reflected electromagnetic radiation as an array of simultaneously captured pixels, and determining a data value for each captured pixel by analyzing the collected electromagnetic radiation. The multiple images are combined into a composite image with better accuracy, and a three-dimensional location is determined for each pixel in the composite image based on analysis of the composite image pixels.

According to another aspect, the subject matter described herein includes a method for acquiring three-dimensional range information of a scene. The method includes obtaining multiple images of a scene, where at least one image is taken using a different focus. Obtaining each image includes generating electromagnetic radiation that is reflected from target objects in the scene about which range information is desired, collecting into a sensor array of at least two dimensions an image of the reflected electromagnetic radiation as an array of simultaneously captured pixels, and determining a data value for each captured pixel by analyzing the collected electromagnetic radiation. The multiple images are combined into a composite image with better accuracy, and a three-dimensional location is determined for each pixel in the composite image based on analysis of the composite image pixels.

According to another aspect, the subject matter described herein includes a method for acquiring three-dimensional range information of a scene. The method includes obtaining multiple images of a scene, where at least one image is taken using a different focal length. Obtaining each image includes generating electromagnetic radiation that is reflected from target objects in the scene about which range information is desired, collecting into a sensor array of at least two dimensions an image of the reflected electromagnetic radiation as an array of simultaneously captured pixels, and determining a data value for each captured pixel by analyzing the collected electromagnetic radiation. The multiple images are combined into a composite image with better accuracy, and a three-dimensional location is determined for each pixel in the composite image based on analysis of the composite image pixels.

According to another aspect, the subject matter described herein includes a method for acquiring three-dimensional range information of a scene. The method includes obtaining multiple images of a scene, where at least one image is taken using a different exposure. Obtaining each image includes generating electromagnetic radiation that is reflected from target objects in the scene about which range information is desired, collecting into a sensor array of at least two dimensions an image of the reflected electromagnetic radiation as an array of simultaneously captured pixels, and determining a data value for each captured pixel by analyzing the collected electromagnetic radiation. The multiple images are combined into a composite image with better accuracy, and a three-dimensional location is determined for each pixel in the composite image based on analysis of the composite image pixels.

According to another aspect, the subject matter described herein includes a system for acquiring three-dimensional range information of a scene. The system includes an electromagnetic radiation source for illuminating a scene about which range information is desired. A sensor array of at least two dimensions collects electromagnetic radiation that is generated from the electromagnetic radiation source and reflected by the scene. An array of pixels is captured simultaneously by the sensor array. A pixel image shifter shifts the image of the scene on the sensor array, where at least one image is shifted a non-integer pixel distance with respect to another of the images, to obtain multiple pixel-shifted images of the scene. A processor determines a data value for each captured pixel based on analysis of the collected electromagnetic radiation, creates a super-resolution image by combining the data values from the multiple pixel-shifted images, and determines the three-dimensional location for each pixel of the super-resolution image based on analysis of the data values for each pixel of the super-resolution image.

According to another aspect, the subject matter described herein includes a system for acquiring three-dimensional range information of a scene. The system includes a range camera having a housing. The housing includes an electromagnetic radiation source for illuminating a scene about which range information is desired. The housing also includes a sensor array of at least two dimensions for collecting electromagnetic radiation that is generated from the electromagnetic radiation source and reflected by the scene, where an array of pixels is captured simultaneously by the sensor array. The housing also includes a processor for determining a data value for each captured pixel based on analysis of the collected electromagnetic radiation, and for determining a three-dimensional location for each captured pixel based on the data values of the captured pixels. The system also includes a storage device, integrated within the housing, for storing the data values, the range values, or both, of the captured pixels.

According to another aspect, the subject matter described herein includes a system for acquiring three-dimensional range information of a scene. The system includes a range camera having a housing. The housing includes an electromagnetic radiation source for illuminating a scene about which range information is desired. The housing also includes a sensor array of at least two dimensions for collecting electromagnetic radiation that is generated from the electromagnetic radiation source and reflected by the scene, where an array of pixels is captured simultaneously by the sensor array. The housing also includes a processor for determining a data value for each captured pixel based on analysis of the collected electromagnetic radiation, for performing geometric or radiometric corrections to the data values of the captured pixels, and for determining a three-dimensional location for each captured pixel based on the data values of the captured pixels.

According to another aspect, the subject matter described herein includes a system for acquiring three-dimensional range information of a scene. The system includes a range camera having a housing. The housing includes an electromagnetic radiation source for illuminating a scene about which range information is desired. The housing also includes a sensor array of at least two dimensions for collecting electromagnetic radiation that is generated from the electromagnetic radiation source and reflected by the scene, where an array of pixels is captured simultaneously by the sensor array. The housing also includes a processor for determining a data value for each captured pixel based on analysis of the collected electromagnetic radiation, for applying noise reduction algorithms to the data values of the captured pixels, and for determining a three-dimensional location for each captured pixel based on the data values of the captured pixels.

According to another aspect, the subject matter described herein includes a system for acquiring three-dimensional range information of a scene. The system includes a range camera having a housing. The housing includes an electromagnetic radiation source for illuminating a scene about which range information is desired. The housing also includes a sensor array of at least two dimensions for collecting electromagnetic radiation that is generated from the electromagnetic radiation source and reflected by the scene, where an array of pixels is captured simultaneously by the sensor array. The housing also includes a processor for determining a data value for each captured pixel based on analysis of the collected electromagnetic radiation, and for determining a three-dimensional location for each captured pixel based on the data values of the captured pixels. The housing also includes a display device for displaying data, range, color, or temperature values for each captured pixel.

According to another aspect, the subject matter described herein includes a system for acquiring three-dimensional range information of a scene. The system includes a range camera having a housing. The housing includes an electromagnetic radiation source for illuminating a scene about which range information is desired. The housing also includes a sensor array of at least two dimensions for collecting electromagnetic radiation that is generated from the electromagnetic radiation source and reflected by the scene, where an array of pixels is captured simultaneously by the sensor array. The housing also includes a processor for determining a data value for each captured pixel based on analysis of the collected electromagnetic radiation, and for determining a three-dimensional location for each captured pixel based on the data values of the captured pixels. The housing also includes a user interface for controlling the generation, collection or analysis of the electromagnetic radiation.

According to another aspect, the subject matter described herein includes a system for acquiring three-dimensional range information of a scene. The system includes a range camera having a housing. The housing includes an electromagnetic radiation source for illuminating a scene about which range information is desired. The housing also includes a range sensor array of at least two dimensions for collecting electromagnetic radiation that is generated from the electromagnetic radiation source and reflected by the scene, where an array of range pixels is captured simultaneously by the range sensor array. The housing also includes a color sensor array of at least two dimensions for collecting electromagnetic radiation from the scene, where an array of color pixels is captured simultaneously by the color sensor array. The housing also includes a processor for determining a three-dimensional location for each captured range pixel, and a color value for each captured color pixel, based on analysis of the collected electromagnetic radiation.

According to another aspect, the subject matter described herein includes a system for acquiring three-dimensional range information of a scene. The system includes a range camera having a housing. The housing includes an electromagnetic radiation source for illuminating a scene about which range information is desired. The housing also includes a sensor array of at least two dimensions for collecting electromagnetic radiation that is generated from the electromagnetic radiation source and reflected by the scene, where an array of pixels is captured simultaneously by the sensor array. The housing also includes a processor for determining a data value for each captured pixel based on analysis of the collected electromagnetic radiation, and for determining a three-dimensional location for each captured pixel based on the data values of the captured pixels. The system also includes a mount including at least one actuator controllable by the processor to control movement of the housing, thereby controlling azimuth and/or elevation of the range camera.

According to another aspect, the subject matter described herein includes a system for acquiring three-dimensional range information of a scene. The system includes a range camera having a housing. The housing includes an electromagnetic radiation source for illuminating a scene about which range information is desired. The housing also includes a sensor array of at least two dimensions for collecting electromagnetic radiation that is generated from the electromagnetic radiation source and reflected by the scene, where an array of pixels is captured simultaneously by the sensor array. The housing also includes a processor for determining a data value for each captured pixel based on analysis of the collected electromagnetic radiation, and for determining a three-dimensional location for each captured pixel based on the data values of the captured pixels. The housing also includes means for controlling exposure of the sensor array to the reflected electromagnetic radiation.

According to another aspect, the subject matter described herein includes a system for acquiring three-dimensional range information of a scene. The system includes a range camera having a housing. The housing includes an electromagnetic radiation source for illuminating a scene about which range information is desired. The housing also includes a sensor array of at least two dimensions for collecting electromagnetic radiation that is generated from the electromagnetic radiation source and reflected by the scene, where an array of pixels is captured simultaneously by the sensor array. The housing also includes a processor for determining a data value for each captured pixel based on analysis of the collected electromagnetic radiation, and for determining a three-dimensional location for each captured pixel based on the data values of the captured pixels. The housing also includes means for controlling the focus of the collected electromagnetic radiation onto the sensor array.

According to another aspect, the subject matter described herein includes a system for acquiring three-dimensional range information of a scene. The system includes a range camera having a housing. The housing includes an electromagnetic radiation source for illuminating a scene about which range information is desired. The housing also includes a sensor array of at least two dimensions for collecting electromagnetic radiation that is generated from the electromagnetic radiation source and reflected by the scene, where an array of pixels is captured simultaneously by the sensor array. The housing also includes a processor for determining a data value for each captured pixel based on analysis of the collected electromagnetic radiation, and for determining a three-dimensional location for each captured pixel based on the data values of the captured pixels. The housing also includes means for controlling the focal length of the collected electromagnetic radiation.

According to another aspect, the subject matter described herein includes a system for acquiring three-dimensional range information of a scene. The system includes a range camera having a housing. The housing includes an electromagnetic radiation source for illuminating a scene about which range information is desired. The housing also includes a sensor array of at least two dimensions for collecting electromagnetic radiation that is generated from the electromagnetic radiation source and reflected by the scene, where an array of pixels is captured simultaneously by the sensor array. The housing also includes a processor for determining a data value for each captured pixel based on analysis of the collected electromagnetic radiation, and for determining a three-dimensional location for each captured pixel based on the data values of the captured pixels. The housing also includes means for controlling the intensity of the illumination generated by the electromagnetic radiation source.

According to another aspect, the subject matter described herein includes a system for acquiring three-dimensional range information of a scene. The system includes a range camera having a housing. The housing includes an electromagnetic radiation source for illuminating a scene about which range information is desired. The housing also includes a sensor array of at least two dimensions for collecting electromagnetic radiation that is generated from the electromagnetic radiation source and reflected by the scene, where an array of pixels is captured simultaneously by the sensor array. The housing also includes a processor for determining a data value for each captured pixel based on analysis of the collected electromagnetic radiation, and for determining a three-dimensional location for each captured pixel based on the data values of the captured pixels. The housing also includes means for controlling the focus of the illumination generated by the electromagnetic radiation source.

According to another aspect, the subject matter described herein includes a system for acquiring three-dimensional range information of a scene. The system includes a range camera having a housing. The housing includes an electromagnetic radiation source for illuminating a scene about which range information is desired. The housing also includes a sensor array of at least two dimensions for collecting electromagnetic radiation that is generated from the electromagnetic radiation source and reflected by the scene, where an array of pixels is captured simultaneously by the sensor array. The housing also includes a processor for determining a data value for each captured pixel based on analysis of the collected electromagnetic radiation, and for determining a three-dimensional location for each captured pixel based on the data values of the captured pixels. The housing also includes means for controlling the focal length of the illumination generated by the electromagnetic radiation source.

According to another aspect, the subject matter described herein includes a system for acquiring three-dimensional range information of a scene. The system includes a range camera for capturing three-dimensional range information of a scene. An arm supports the range camera, and is pivotally coupled to the range camera. A stand supports the arm, and is pivotally coupled to the arm in a manner that allows the range camera to obtain an unobstructed image of a scene underneath the stand.

As used herein, the term "light" refers to electromagnetic radiation that may include but is not limited to visible light; the term may refer to electromagnetic radiation in the infrared and ultraviolet frequencies, for example.

As used herein, the term "image" refers to data collected from, associated with, or representing a scene. Image data may represent various characteristics of a scene, such as color, temperature, range, and reflectivity.

The subject matter described herein for acquiring three-dimensional range information may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, application specific integrated circuits, and downloadable electrical signals. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

In accordance with the subject matter disclosed herein, methods, systems, and computer program products are provided for acquiring three-dimensional range information.

Figure 1:
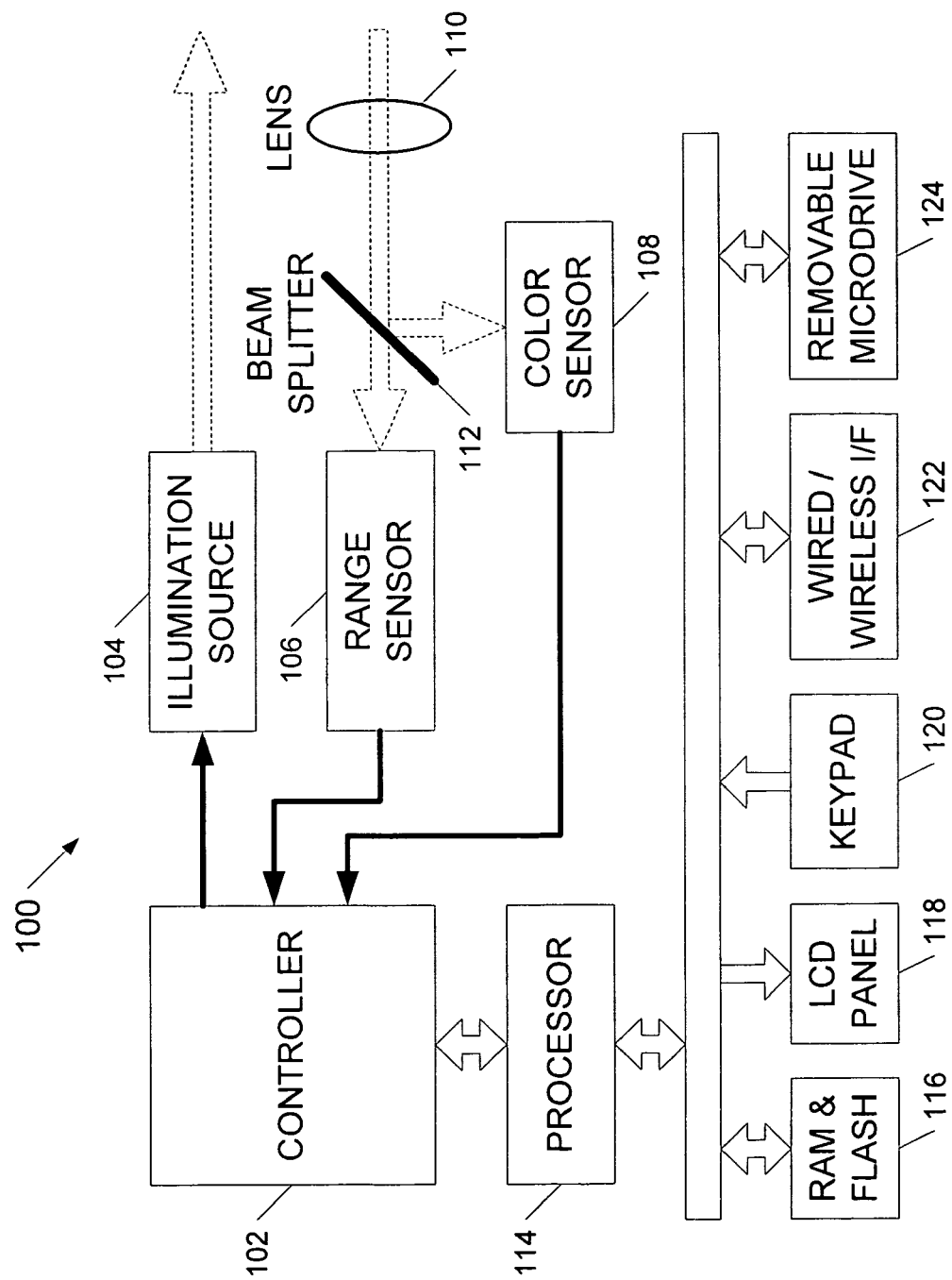
FIG. 1 is a block diagram illustrating an exemplary system for acquiring three-dimensional range information according to an embodiment of the subject matter described herein.

FIG. 1 is a block diagram illustrating an exemplary range camera according to an embodiment of the subject matter described herein. In FIG. 1, a range camera 100 may include a controller 102 to control an illumination source 104, and to capture data from a range sensor 106. Range sensor 106 may be a sensor array of at least two dimensions and which may capture an array of pixels simultaneously. Some embodiments may also include a color sensor 108 which may be a sensor array of at least two dimensions, which may capture an array of pixels simultaneously, and which may be controlled by controller 102. In some embodiments, range camera 100 may include means for controlling the focus and/or focal length of the image to be captured. Example means for controlling the focus and/or focal length of the image to be captured may include a lens 110, which may be a simple lens or lens array and which may be of fixed focal length or of variable focal length (i.e., a zoom lens). The focus and/or focal length may be controlled manually, automatically (e.g., autofocus or autozoom) or programmatically based on the characteristics of the scene (e.g., multi-focus techniques in which focus or zoom is determined based on sampling multiple portions of the scene). Similar means may be used to control the focus and/or focal length of the illumination generated by illumination source 104. In some embodiments, range camera 100 may include means for controlling exposure of the image. Example means for controlling exposure of the image on range sensor 106 or color sensor 108 may include one or more fixed or variable apertures (not shown) to control the exposure amount, and one or more shutters (not shown) to control the exposure time. Example means to control intensity of the illumination provided by illumination source 104 may include using an aperture (not shown) and using a variable intensity illumination source 104. In some embodiments, range camera 100 may include a beam splitter 112 for sending images to separate color and range sensors. Beam splitter 112 may also separate visible light, for example, from other electromagnetic radiation frequencies and steer each to the appropriate sensor. In some embodiments, the lens, the sensors, or both may be physically moved in one or more directions through the use of piezoelectric or other actuators, in order to collect pixel-shifted images.

Range camera 100 may include a processor 114 which may run Linux, Windows CE, or other operating system software, and which may run some custom application software. Processor 114 may be connected to standard peripherals including memory 116, such as random access memory (RAM) or flash programmable (FLASH) read only memory (ROM); a display 118, such as an LCD panel; human interface devices (HID), such as a keypad 120; wired or wireless interfaces 122, such as Ethernet, IEEE 1394 (Firewire), and USB 2.0. In some embodiments, range camera 100 may include storage 124, such as a multi-gigabyte removable microdrive or other storage media. Memory 116, display 118, keypad 120, storage 124, and other components of range camera 100 may be integrated into, detachable from, or external to the body of range camera 100. For example, storage 124 may be a floppy disk, hard disk microdrive, flash drive, compact flash card, memory stick, other removable media, or some combination thereof. Keypad 120, for example, may be a detachable keyboard or keypad, user controls on the range camera body, a touch-sensitive screen either separate from or integrated with display 118, and so on. Display 118 may show a preview of the scene (e.g., range, color, temperature, etc.) before it is captured. It may allow the user to review the image captured before storing the image. Display 118 may display range data in pseudo-color or false color, or as shades of brightness in a mono-color image. At least one of interfaces 122 may be used to control external accessories, such as stepper motors or other actuators that control azimuth and/or elevation of a camera mount, for example, or may be a communications port by which a user may, for example, operate range camera 100 by wired or wireless remote control, such as by using an infra-red transmitter or a wireless device.

Processor 114 may control the operation of various components of range camera 100, such as lens 110 and/or an aperture (not shown) in order to perform auto-focus, auto-zoom (magnify), and auto-exposure functions, for example. In some embodiments, range camera 100 is attached to a motorized mount which controls azimuth and/or elevation of the image. In some embodiments, the motorized mount may be controlled manually, or by range camera 100. Processor 114 may also control the actuators used to move lens 110, range sensor 106, and color sensor 108 during pixel image shifting, and may even perform pixel image shifting by controlling azimuth and/or elevation of a motorized camera mount.

In some embodiments, processor 114 may improve range accuracy by applying image processing functions to range data. Example image processing functions may include: image correction, such as geometric correction; correction for defects in lenses and sensors; noise reduction such as data averaging and median filtering; chirp and pseudo-noise demodulation; image filtering; image adjustment, such as color, contrast, and brightness adjustment; sensor array resolution increasing functions, such as super-resolution algorithms; sensor array accuracy improvement functions, such as compensation for ambient light and compensation for reflectivity; and sensor array error correction functions, such as gamma correction, adjustments to gain and offset to eliminate variations among pixels (radiometric correction), and interpolation of neighboring pixels to determine a value for inoperative pixels in the array. Multiple images of the same scene, obtained using different focus, zoom, or exposure settings, may be combined to create a more accurate or higher resolution image. Processor 114 may perform software programs related to the operation of the range camera, such as displaying camera status and settings, getting and setting image parameters such as horizontal or vertical field of view, exposure time, resolution, focus, etc., and controlling modes of operation. Processor 114 may perform image manipulation functions, such as combining range and color data, registration of image data, compression (e.g., JPEG encoding), conversion from one storage format to another, etc. It may create 3D range data in three-dimensional Cartesian, polar, and/or spherical coordinates, or in other forms that can be imported into other programs, such as drafting programs.

The functions of controller 102 and processor 114 may be incorporated in various combinations of hardware, software, and firmware. For example, some or all of controller 102 functions may be performed by processor 114, and vice-versa.

Figure 2:
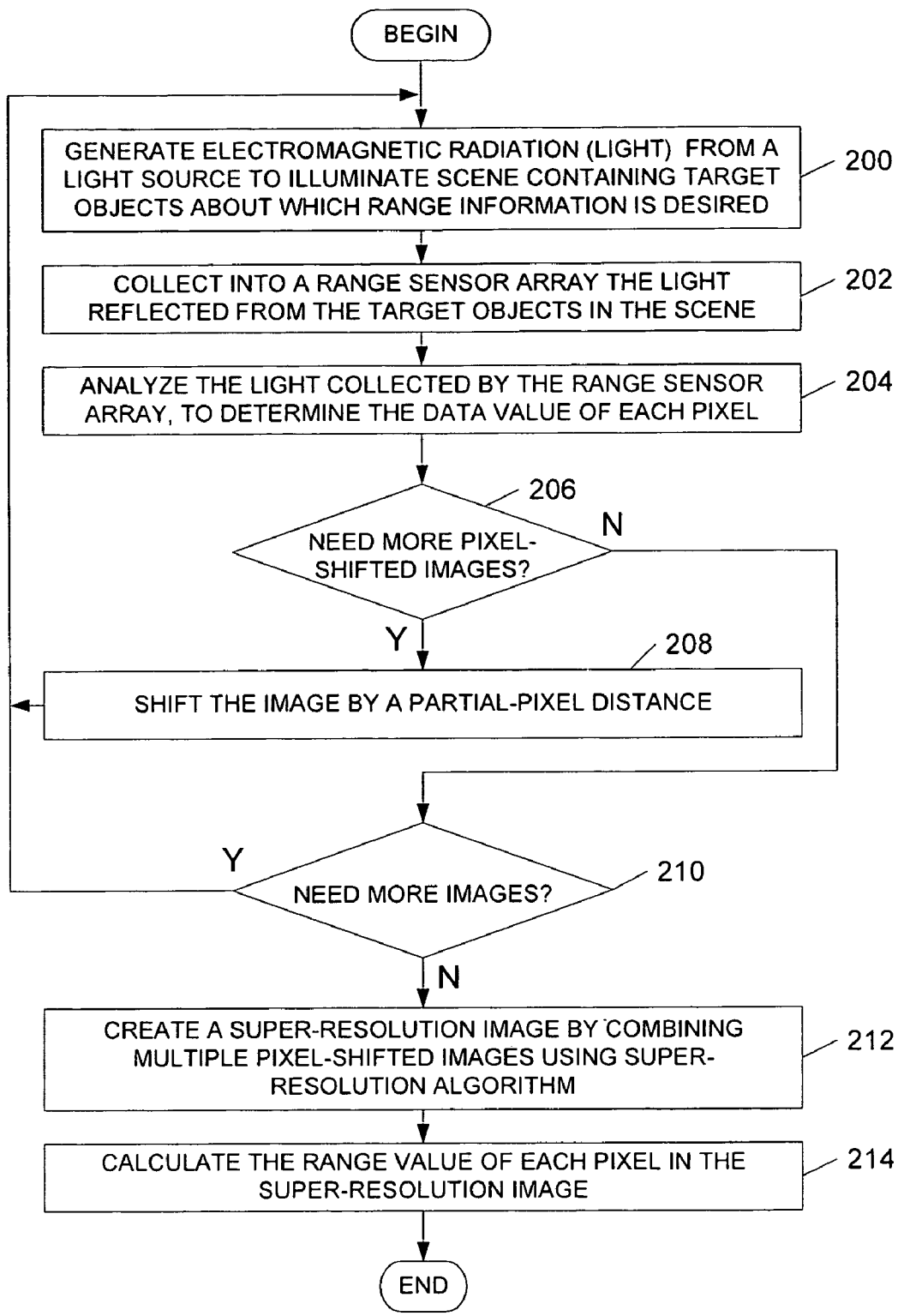
FIG. 2 is a flow chart illustrating an exemplary process for acquiring three-dimensional range information according to an embodiment of the subject matter described herein.

FIG. 2 is a flow chart illustrating an exemplary process for acquiring three-dimensional range information in accordance with an embodiment of the subject matter described herein. Referring to FIG. 2, the process can begin at step 200, in which illumination source 104 generates electromagnetic radiation (light), such as infrared (IR) light, that illuminates the scene and is reflected by target objects about which range information is desired.

At step 202, the reflected light is collected using range sensor 106, which may be a sensor array of at least two dimensions. Range sensor 106 may be a CCD sensor array, a CMOS sensor array, an avalanche photodiode (APD) sensor array, or similar, or a combination of the above. The incoming image may be split by beam splitter 112 and collected by color sensor 108. Beam splitter 112 may direct certain light frequencies toward the appropriate sensor. For example, the IR light may be directed toward range sensor 106 while visible light may be directed toward color sensor 108.

At step 204, the light that has been collected by the sensor array is analyzed to determine a data value for each pixel in the sensor array. In one embodiment, the data value may be derived from the measured time of flight of a light pulse emitted from illumination source 104, reflected by target objects in the scene, and collected by range sensor 106. For example, the data value may correspond to the number of clock cycles measured from the time the light pulse was transmitted until the reflected light pulse is collected. If each clock cycle is 1 nanosecond, 25 cycles counted between generation and collection of the light pulse corresponds to 25 nanoseconds.

In another embodiment, the time of flight may be derived by illuminating the scene with amplitude-modulated light from illumination source 104 and measuring the amplitude modulation phase delay between the generated and collected light. In this embodiment, amplitude-modulated light that is reflected off of near objects may return to range sensor 106 in a relatively short time as compared to light reflected off of far objects and will thus have a relatively small phase delay. Amplitude-modulated light that is reflected off of far objects may return to range sensor 106 in a relatively long time as compared to light reflected off of near objects and will thus have a relatively large phase delay. The data value for each pixel may thus be an analog or digital value corresponding to a phase delay between 0 and $2\pi$ radians.

In another embodiment, a short light pulse is generated by illumination source 104. The short light pulse may be reflected by the target objects in the scene and collected by a CCD range sensor 106. The data value may be derived either from the charge collected by each pixel in CCD range sensor 106 or from the total charge collected by each pixel in CCD range sensor 106, integrated over the duration of the collection step. A fast optical shutter may be positioned in front of range sensor 106. The shutter operation may be timed so that the shutter opens in time to allow most light reflected from near objects to be collected, but closes before light reflected from far objects has time to arrive; this may result in the charge collected by each pixel being inversely proportional to the range of the object viewed by that pixel. Alternatively, the shutter operation may be timed so that the shutter opens too late to allow most light reflected from near objects to be collected, but opens in time to allow most light reflected from far objects to be collected; this may result in the charge collected by each pixel being directly proportional to the range of the object viewed by that pixel.

At step 206, it is determined whether all pixel-shifted images have been captured. If not, the process moves to step 208, in which the image of the scene to be collected by range sensor 106 is shifted a partial-pixel distance with respect to the previous image taken, and the process goes again to step 200 to capture the next image.

At step 208, the image may be shifted a distance which is a non-integer multiple of the sensor's pixel pitch (hereinafter referred to as a partial-pixel distance) with respect to the previous image taken by, for example, moving range sensor 106, moving lens 110, moving both lens 110 and range sensor 106, moving range camera 100 on its mount, some combination of the above, or other similar means. In some instances, it may be desirable to shift the image an integer pixel distance. For example, a composite image may be created by tiling multiple images, with or without overlapping pixels. The lens and/or range sensor may be moved by piezoelectric or other suitable actuators. The range camera body may be moved using piezoelectric, stepper motor, or other suitable actuators. In some embodiments, range sensor 106 used within range camera 100 may have a fixed resolution (M×N pixels) than is lower resolution than desirable for some applications. In order to obtain higher resolution array data, the range image may be shifted a partial-pixel distance on the image sensor and a new range image obtained. Multiple pixel-shifted images may be combined to provide a higher resolution overall image. For example, the image may be shifted 3 times, by a partial-pixel distance equal to ½ of the pixel pitch in each case, so that sensor pixel [i,j] is used to acquire data corresponding to pixel locations [i,j]; [i+½,j]; [i,j+½]; [i+½,j+½]. It should be noted that a partial-pixel distance greater than the sensor's pixel pitch may also be used. This data may be readily reformatted to provide an image of resolution 2M×2N from a sensor of resolution M×N. The range information from the pixel-shifted range images may be mathematically combined with each other using known super-resolution algorithms originally developed for 2D camera and video images. The resultant higher-resolution image is hereinafter referred to as a super-resolution image.

At step 210, if additional images are required, the process returns to step 200; otherwise, the process moves to step 212. In some embodiments, additional images may be used to improve the accuracy of range data. Where the range-finding method is based on the energy, rather than the phase, of the light collected, compensating for ambient light or for reflectivity may be particularly important for accurately determining range. To compensate for ambient light, an image may be captured without the use of illumination source 104, in order to establish a baseline value for the ambient light illuminating the scene. This baseline ambient value may then be part of the range data calculation, so that the range error caused by ambient light is removed. To compensate for reflectivity, an image may be captured while illumination source 104 generates a continuous source of illumination (rather than a pulse or intermittent illumination). Highly reflective objects may appear brighter, and may therefore appear closer, than objects with low reflectivity, even if both objects are at the same range. The baseline reflectivity value may then be part of the range data calculation so that the range error caused by reflectivity of the target objects may be removed.

For each image, whether it be a pixel-shifted image, an image to establish ambient or reflectivity baselines, or other, multiple images may be taken, and their values averaged, in order to correct for image noise such as shot noise, for example. It should be noted also that the order in which the images are taken is not important. For example, images taken to establish baselines for ambient light and reflectivity may be taken before, after, or while pixel-shifted images are taken.

At step 212, the multiple pixel-shifted images may be combined to form a super-resolution image using a super-resolution algorithm. In one example, a super resolution algorithm may include algorithmically combining neighboring pixels (e.g., averaging, weighted averaging, linear combination, etc.) to obtain a range, color, or other value for a particular pixel of the super-resolution image. An exemplary super-resolution algorithm suitable for use with embodiments of the subject matter described herein is the Nonuniform Interpolation algorithm, described in "Super Resolution Image Reconstruction: A Technical Overview" by Sung Cheol Park, Min Kyu Park, and Moon Gi Kang in IEEE Signal Processing Magazine, May 2003, pp 21-36.

At step 214, the data value of each pixel in the super-resolution image may be used to calculate the range value of each pixel in the super-resolution image. For example, if the data value of each pixel is a time of flight measurement, the distance D may be calculated by the standard formula "distance=rate×time", where rate is the speed of light (c), approximately $3.0 \times 10^8$ meters per second. Since the time of flight is the round trip distance to the target and back, the value for time is divided by two to get the time to the target, for a final equation of "D=½×T×c". For a time of flight data value of 20 nanoseconds, the calculated range value for that pixel is 3 meters. In another example, if the data value of each pixel corresponds to an amplitude modulation phase delay, distance D may be calculated by the equation "D=½×c×(phase/$2\pi f_m$)". Given an amplitude-modulated light source with an amplitude modulation frequency (AMF) of 50 MHz, and a detected phase of 90 degrees, D is calculated to be 75 centimeters. Because an object 75 centimeters away from the camera and thus having a phase delay of 90 degrees is indistinguishable from an object 375 centimeters away from the camera and thus having a phase delay of 450 degrees (450−360=90), in one embodiment, a range measurement is repeated using a second amplitude modulation frequency, and the correct distance is determined by analyzing the two calculated range values. For example, suppose a target object is 7 meters from the range camera. A measurement is taken using amplitude modulation frequency AMF1, for which a phase delay of 360 degrees corresponds to 4 meters. The target object's phase delay will be 270 degrees, and so the distance of the target object could be 3, 7, or 11 meters. A second measurement is taken using amplitude modulation frequency AMF2, for which a phase delay of 360 degrees corresponds to 3 meters. The target object's phase delay is 120 degrees, and so the distance of the target object could be 1, 4, 7, or 10 meters. The true distance of the object can be determined by finding the least common distance of the two readings—7 meters.

The three-dimensional location of each pixel may be computed considering the optical geometry of range sensor 106 and lens 110. Display 118 may display information such as the raw pixel data, the color data, and the computed range data. Range may be indicated by false color on a color display, or by brightness on a color or monochrome display, for example. The computed three-dimensional location data may also be displayed, for example as a wire-frame representation of the scene, a filled-polygon representation of the scene, or similar. The color data, range data, three-dimensional location data, etc., may be communicated to another device, such as a personal computer, via interfaces 122, or stored locally in a hard-drive, floppy, flash drive, or other storage 124.

Figure 3:
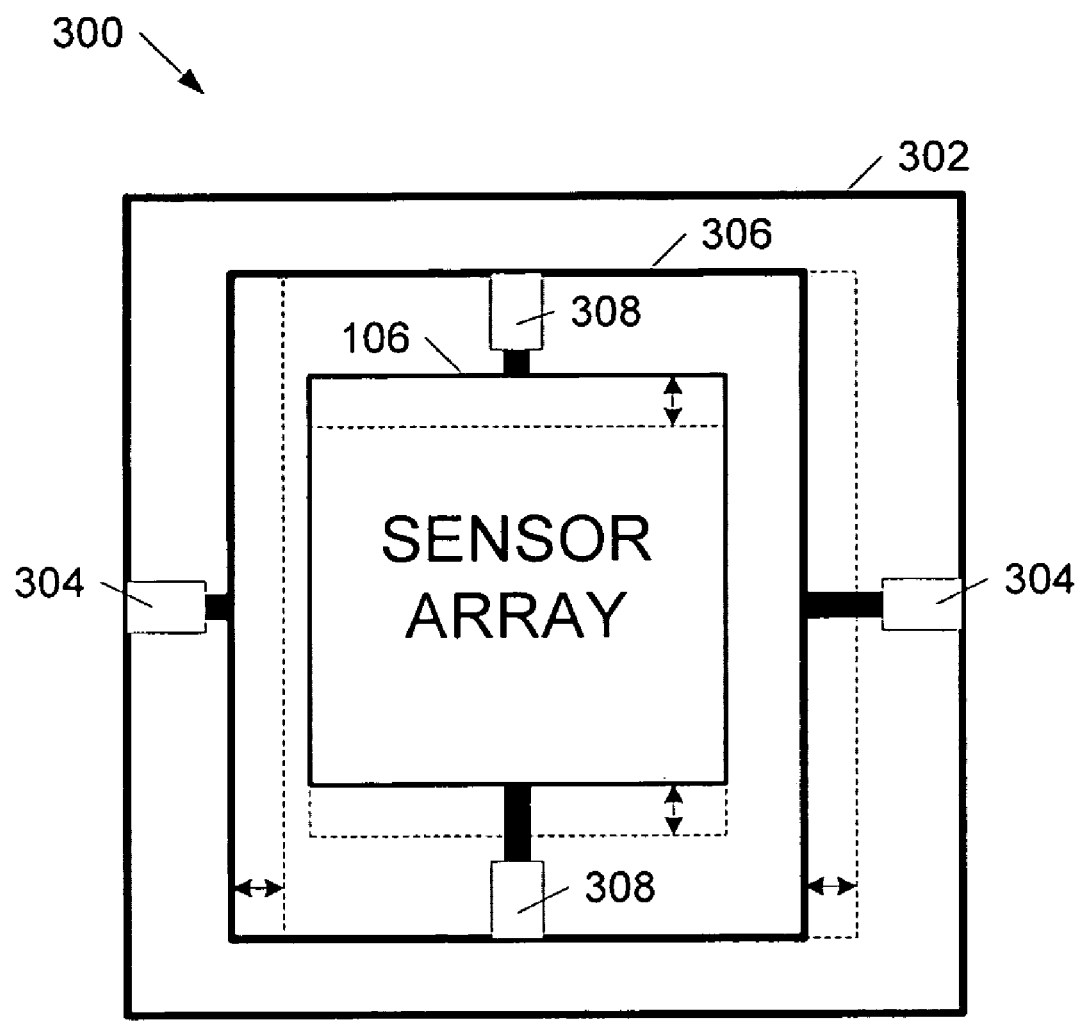
FIG. 3 is a plan view illustrating an exemplary pixel image shifter according to an embodiment of the subject matter described herein.

FIG. 3 is plan view illustrating an exemplary pixel image shifter according to an embodiment of the subject matter described herein. Referring to FIG. 3, pixel image shifter 300 may include a stationary base or frame 302, which may be affixed to the chassis or body of range camera 100, and upon which may be mounted one or more horizontal actuators 304, which may operate in concert to horizontally shift carriage 306, upon which are mounted one or more vertical actuators 308, which may operate in concert to vertically shift a sensor array, such as range sensor 106. The horizontal and vertical actuators may be piezoelectric or other suitable actuators, and may shift the array horizontally, vertically, or both, such that the image position on the sensor array is shifted a partial-pixel distance relative to another image. There are a variety of other possible embodiments, structures, types and placement of actuators, etc., by which a pixel image shifter could be implemented, and therefore the embodiment illustrated in FIG. 3 is for illustrative purposes only, and is not intended to limit the scope of the subject matter described herein. For example, the pixel image shift may be achieved by moving a lens component rather than the sensor array, by moving both a lens component and the sensor array relative to each other, and by moving the camera body, in whole or in part, or some combination thereof.

Figure 4:
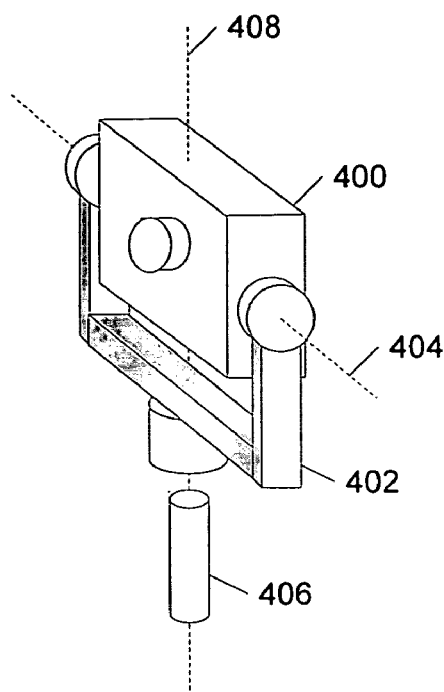
FIG. 4 is a perspective view illustrating a conventional tilt and swivel mount in which the altitude and azimuth rotational axes intersect.

In order to fully reproduce a scene in three dimensions, it may be necessary to capture range information for an entire volume of a scene, including the volume above and below a range camera. Range cameras, therefore, have particular mounting requirements that may not be met by conventional tilt and swivel mounts. FIG. 4 is a perspective view illustrating a conventional tilt and swivel mount in which the elevation and azimuth rotational axes intersect. Referring to FIG. 4, camera 400 is pivotally attached to a U-shaped bracket 402 in a manner which allows camera 400 to rotate around elevation axis 404 (i.e., tilt) in order to adjust the elevation or altitude of the desired image. Bracket 402 is pivotally attached to stand 406 in a manner which allows bracket 402 to rotate around an azimuth axis 408 (i.e., swivel) in order to adjust the azimuth or compass direction of the desired image.

Figure 5:
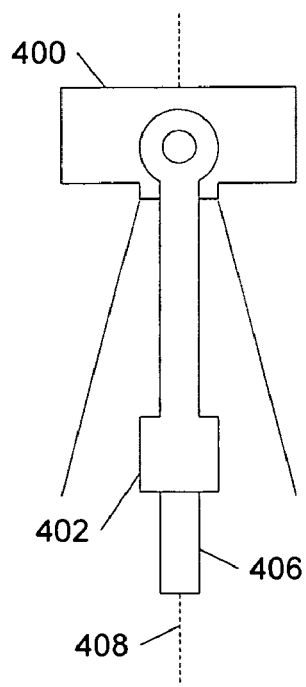
FIG. 5 is a side view illustrating the disadvantage suffered by the tilt and swivel mount as illustrated in FIG. 4.

FIG. 5 is a side view illustrating the disadvantage suffered by the tilt and swivel mount as illustrated in FIG. 4. Referring to FIG. 5, although camera 400 has been tilted downward, its view of the area underneath stand 406 is obstructed by bracket 402. Depending upon the geometry of bracket 402, a significant portion of the scene directly underneath camera 400 may be unavailable for image capture, possibly requiring a second image to be taken from a different position in the scene, which leads to further problems such as registration of multiple images in order to obtain the entire scene.

To meet a range camera's need to be able to capture image data not only around the camera but also above and below the camera, an offset mount is required in which the two rotation axes are orthogonal to each other and do not intersect.

Figure 6:
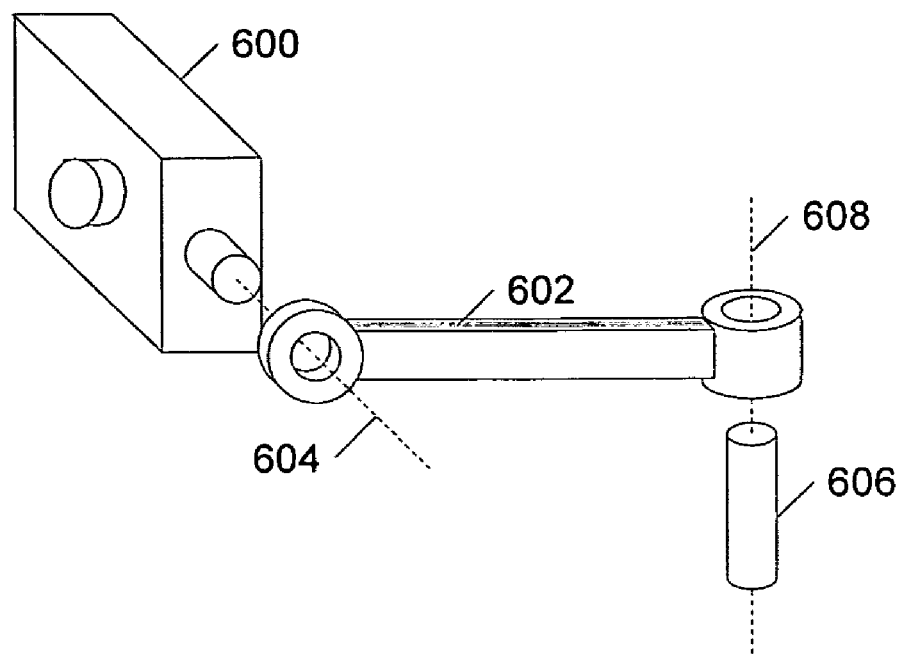
FIG. 6 is a perspective view illustrating an exemplary range camera and offset mount for obtaining an unobstructed view of the area underneath the mount according to an embodiment of the subject matter described herein.

FIG. 6 is perspective view illustrating an exemplary range camera and offset mount for obtaining an unobstructed view of the area underneath the mount according to an embodiment of the subject matter described herein. Referring to FIG. 6, housing 600 may contain some or all of the elements of range camera 100, such as lens 110, range sensor 106, and illumination source 104. In one embodiment, housing 600 is pivotally coupled to one end of arm 602 in a manner which allows housing 600 to rotate around an elevation axis 604 in order to adjust the elevation or altitude of the desired image. The other end of arm 602 is pivotally coupled to stand 606 in a manner which allows arm 602 to rotate around an azimuth axis 608 in order to adjust the azimuth or compass direction of the desired image. Arm 602 is designed so as to ensure that elevation axis 604 is orthogonal to and does not intersect azimuth axis 608, and is of a length sufficient to allow housing 600 to rotate relative to arm 602 such that an image may be taken of a scene which includes the area anywhere along azimuth axis 608. Stand 606 may be affixed atop or to the side of a pedestal or base (not shown) such as a tripod or other legged support, a dolly or other wheeled support, a post, or other fixed or moveable support. Stand 606 may be affixed below a hanging support such as a bar, shaft, slider, articulated arm, or similar. Housing 600 may be coupled to arm 602 by an actuator (not shown), such as a stepper motor or other type of motor, which may be controlled by range camera 100. The stepper motor body may be attached to housing 600 and the stepper motor shaft may be attached to arm 602, or vice-versa. Similarly, arm 602 may be coupled to stand 606 by an actuator (not shown), such as a stepper motor or other type of motor, which may be controlled by range camera 100. The stepper motor body may be attached to arm 602 and the stepper motor shaft may be attached to stand 606, or vice-versa.

The example in FIG. 6 is shown for illustrative purposes only, and is not intended to limit the scope of the subject matter described herein. The subject matter described herein is not limited to an altitude/azimuth coordinate system, nor is it limited to the particular implementation of an altitude/azimuth coordinate system described above. For example, housing 600 may be pivotally attached to arm 602 such that housing 600 may rotate around a vertical axis (relative to housing 600 as shown in FIG. 6), and arm 602 may be pivotally attached to stand 606 such that arm 602 may rotate around a horizontal axis.

Figure 7:
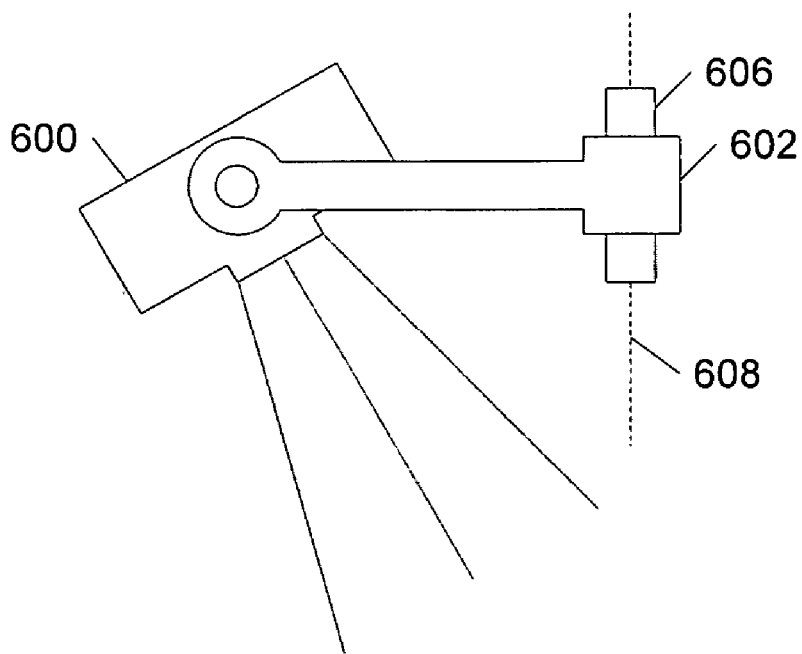
FIG. 7 is a side view illustrating exemplary operation of the exemplary offset mount as illustrated in FIG. 6.

FIG. 7 is a side view illustrating the advantage provided by the offset mount as described herein. Referring to FIG. 7, which is a side view, arm 602 is shown in profile. For simplicity, a pedestal below stand 606 and to which stand 606 may be affixed is not shown. Housing 600 has been rotated along elevation axis 604 such that the range camera lens is directed toward the area underneath stand 606. It can be seen that neither arm 602 nor any other part of the offset mount obstructs the view of the area directly underneath housing 600, arm 602, or stand 606. Thus, the use of an offset mount as described herein avoids the necessity for capturing and registering multiple images in order to obtain image data for the entire scene.

It will be understood that various details of the invention may be changed without departing from the scope of the invention. Furthermore, the foregoing description is for the purpose of illustration only, and not for the purpose of limitation.

What is claimed is:

1. A method for acquiring three-dimensional range information of a scene, the method comprising:
   (a) obtaining a plurality of pixel-shifted images of a scene, at least one of the images being shifted by a non-integer pixel value with respect to another of the images, wherein obtaining each of the pixel-shifted images includes:
      (i) generating electromagnetic radiation that is reflected from target objects in the scene about which range information is desired;
      (ii) collecting, using a sensor array of at least two dimensions, images of the reflected electromagnetic radiation, wherein each image includes an array of simultaneously-captured pixels; and
      (iii) determining a data value for each captured pixel based on analysis of the collected electromagnetic radiation;
   (b) creating a super-resolution image of the scene by combining the data values from the plurality of pixel-shifted images; and
   (c) determining a three-dimensional location for each pixel of the super-resolution image based on analysis of the data values of the super-resolution image.

2. The method of claim 1 wherein obtaining a plurality of pixel-shifted pixel images of a scene includes adjusting zoom at which each of the images are obtained.

3. The method of claim 1 wherein generating electromagnetic radiation includes generating an electromagnetic radiation pulse from the electromagnetic radiation source.

4. The method of claim 1 wherein determining a data value for each pixel of the sensor array includes measuring a time of flight of the electromagnetic radiation.

5. The method of claim 1 wherein determining a data value for each pixel of the sensor array includes measuring energy of the electromagnetic radiation collected during a time interval.

6. The method of claim 5 including using a shutter for controlling the collection of electromagnetic radiation.

7. The method of claim 5 wherein the time interval comprises an interval sufficient for the electromagnetic radiation to reflect from a farthest object in the scene and return to the sensor array to be collected.

8. The method of claim 1 wherein:
   (a) generating electromagnetic radiation includes generating amplitude-modulated electromagnetic radiation at a modulation frequency;
   (b) collecting the reflected electromagnetic radiation includes collecting reflected amplitude-modulated electromagnetic radiation; and
   (c) determining a data value for each pixel of the sensor array includes measuring relative amplitude phase delay between the generated and collected electromagnetic radiation.

9. The method of claim 8 wherein:
   (a) generating amplitude-modulated electromagnetic radiation at a modulation frequency includes generating amplitude-modulated electromagnetic radiation at a first amplitude modulation frequency and a second amplitude modulation frequency; and
   (b) determining a data value for each pixel of the sensor array includes:
      (i) determining a first phase value by measuring relative amplitude phase delay between the generated and collected amplitude-modulated electromagnetic radiation of the first amplitude modulation frequency;

(ii) determining a second phase value by measuring relative amplitude phase delay between the generated and collected amplitude-modulated electromagnetic radiation of the second amplitude modulation frequency; and (iii) determining a data value by analyzing the first and second phase values.

10. The method of claim 1 wherein generating electromagnetic radiation includes generating visible light.

11. The method of claim 1 wherein generating electromagnetic radiation includes generating near-infrared electromagnetic radiation.

12. The method of claim 1 wherein generating electromagnetic radiation includes generating far-infrared electromagnetic radiation.

13. The method of claim 1 wherein generating electromagnetic radiation includes using a laser for generating the electromagnetic radiation.

14. The method of claim 1 wherein generating electromagnetic radiation includes using a light emitting diode for generating the electromagnetic radiation.

15. The method of claim 1 wherein using a sensor array includes using a complementary metal oxide semiconductor (CMOS) sensor array.

16. The method of claim 1 wherein using a sensor array includes using a charge-coupled device (CCD) sensor array.

17. The method of claim 1 wherein using a sensor array includes using an avalanche photo diode (APD) sensor array.

18. The method of claim 1 wherein using a sensor array includes using a color sensor array.

19. The method of claim 18 wherein using a color sensor array includes using a red-green-blue (RGB) color sensor array.

20. The method of claim 1 wherein obtaining a plurality of pixel-shifted images includes moving a lens, the movement being a distance such that at least some of the images collected by the sensor array are shifted a non-integer pixel distance with respect to each other on the sensor array.

21. The method of claim 1 wherein obtaining a plurality of pixel-shifted images includes moving the sensor array, the movement being a distance such that at least some of the images collected by the sensor array are shifted a non-integer pixel distance with respect to each other on the sensor array.

22. The method of claim 1 wherein obtaining a plurality of pixel-shifted images includes moving both a lens and the sensor array such that the relative movement of the lens and the sensor array is of a distance that results in at least some of the images collected by the sensor array being shifted by a non-integer pixel distance with respect to each other on the sensor array.

23. The method of claim 1 wherein obtaining a plurality of pixel-shifted images includes using at least one actuator to move at least one of a lens and the sensor array, the movement being a distance such that at least some of the images collected by the sensor array are shifted by a non-integer pixel distance with respect to each other on the sensor array.

24. The method of claim 23 wherein the at least one actuator comprises a piezoelectric actuator.

25. The method of claim 1 comprising applying an image processing function to at least one of the collected images and the super-resolution image to correct a range error.

26. The method of claim 25 wherein applying an image processing function includes applying at least one of a gamma adjustment function, a brightness adjustment function, a contrast adjustment function, and a color adjustment function.

27. The method of claim 1 wherein obtaining a plurality of pixel-shifted images includes obtaining a plurality of each pixel-shifted image and applying a noise reduction algorithm to the data values of the plurality of each pixel-shifted image to reduce errors introduced by noise.

28. The method of claim 27 wherein the noise reduction algorithm comprises one of an averaging algorithm, a median filtering algorithm, a chirp demodulation algorithm, and a pseudo-noise demodulation algorithm.

29. The method of claim 1 wherein obtaining a plurality of pixel-shifted images includes correcting the data values of the captured pixels to compensate for range errors introduced by the sensor array.

30. The method of claim 29 wherein correcting the data values of the captured pixels to compensate for range errors introduced by the sensor array includes, in response to detecting a non-functioning pixel in the sensor array, interpolating a value for the non-functioning pixel based on values of neighboring pixels.

31. The method of claim 1 wherein obtaining a plurality of pixel-shifted images includes correcting the data values of the captured pixels to compensate for range errors introduced by a lens aberration.

32. The method of claim 1 wherein the data value for each pixel of the sensor array comprises at least one of range of the scene, reflectivity of the scene, color of the scene, and temperature of the scene.

33. The method of claim 1 wherein combining the data values from the plurality of pixel-shifted images includes using a super-resolution algorithm to create the super-resolution image of the scene.

34. The method of claim 1 wherein collecting the reflected electromagnetic radiation includes using means for controlling exposure of the pixel-shifted images onto the sensor array.

35. The method of claim 1 wherein collecting the reflected electromagnetic radiation includes using means for controlling focal length of the pixel-shifted images onto the sensor array.

36. The method of claim 1 wherein collecting the reflected electromagnetic radiation includes using means for controlling focus of the pixel-shifted images onto the sensor array.

37. The method of claim 1 wherein generating the electromagnetic radiation includes using means for controlling intensity of the generated electromagnetic radiation.

38. The method of claim 1 wherein generating the electromagnetic radiation includes using a variable intensity electromagnetic radiation source.

39. The method of claim 1 wherein generating the electromagnetic radiation includes using means for controlling focal length of the generated electromagnetic radiation.

40. The method of claim 1 wherein generating the electromagnetic radiation includes using means for controlling focus of the generated electromagnetic radiation.

41. The method of claim 1 wherein determining a three-dimensional location for each pixel of the super-resolution image includes determining a set of three-dimensional coordinates for each pixel of the super-resolution image.

42. The method of claim 41 wherein determining a set of three-dimensional coordinates for each pixel includes determining at least one of three-dimensional Cartesian, polar, and spherical coordinates for each pixel of the super-resolution image.

43. A method for acquiring three-dimensional range information of a scene, the method comprising:

in a range camera:

(a) generating non-spatially-patterned electromagnetic radiation that is reflected from target objects in the scene about which range information is desired;

(b) collecting, using a sensor array of at least two dimensions, the reflected electromagnetic radiation, wherein an array of pixels is captured simultaneously;

(c) determining a data value for each captured pixel based on analysis of the collected electromagnetic radiation;

(d) determining a three-dimensional location for each captured pixel based on analysis of the data value of each captured pixel; and (e) storing at least one of the data value for each captured pixel and the location for each captured pixel in a storage medium local to the range camera.

44. A method for acquiring three-dimensional range information of a scene, the method comprising:

in a range camera:

(a) generating non-spatially-patterned electromagnetic radiation that is reflected from target objects in the scene about which range information is desired;

(b) collecting, using a sensor array of at least two dimensions, the reflected electromagnetic radiation, wherein an array of pixels is captured simultaneously;

(c) determining a data value for each captured pixel based on analysis of the collected electromagnetic radiation;

(d) performing at least one of geometric and radiometric corrections to the range value for each captured pixel; and (e) determining a three-dimensional location for each captured pixel based on analysis of the data value of each captured pixel.

45. A method for acquiring three-dimensional range information of a scene, the method comprising:

in a range camera:

(a) generating electromagnetic non-spatially-patterned radiation that is reflected from target objects in the scene about which range information is desired;

(b) collecting, using a sensor array of at least two dimensions, the reflected electromagnetic radiation, wherein an array of pixels is captured simultaneously;

(c) determining a data value for each captured pixel based on analysis of the collected electromagnetic radiation;

(d) applying a noise reduction algorithm to the data values for each captured pixel for reducing error introduced by noise; and (e) determining a three-dimensional location for each captured pixel based on analysis of the data value of each captured pixel.

46. A method for acquiring color and three-dimensional range information of a scene, the method comprising:

in a range camera:

(a) generating non-spatially-patterned electromagnetic radiation that is reflected from target objects in the scene about which range information is desired;

(b) collecting, using a range sensor array of at least two dimensions, the reflected electromagnetic radiation, wherein an array of range pixels is captured simultaneously;

(c) collecting, using a color sensor array of at least two dimensions, electromagnetic radiation from the scene, wherein an array of color pixels is captured simultaneously;

(d) determining a three-dimensional location for each captured range pixel based on analysis of the captured range pixels; and (e) determining a color value for each captured color pixel based on analysis of the captured color pixels.

47. A method for acquiring three-dimensional range information of a scene, the method comprising:

(a) obtaining a plurality of images of a scene, wherein obtaining each of the images includes:

(i) generating electromagnetic radiation that is reflected from target objects in the scene about which range information is desired;

(ii) collecting, using a sensor array of at least two dimensions, the reflected electromagnetic radiation, wherein an array of pixels is captured simultaneously and wherein at least one of azimuth and elevation is changed at least once during the collecting; and (iii) determining a data value for each captured pixel based on analysis of the collected electromagnetic radiation;

(b) creating a composite image of the scene by combining the data values from the plurality of images; and (c) determining a three-dimensional location for each pixel of the composite image based on analysis of the data values of each pixel of the composite image.

48. A method for acquiring three-dimensional range information of a scene, the method comprising:

(a) obtaining a plurality of images of a scene, wherein obtaining each of the images includes:

(i) generating non-spatially-patterned electromagnetic radiation that is reflected from target objects in the scene about which range information is desired;

(ii) collecting, using a sensor array of at least two dimensions, the reflected electromagnetic radiation, wherein an array of pixels is captured simultaneously and wherein focus of at least one of the generated and collected electromagnetic radiation is changed at least once during the collecting; and (iii) determining a data value for each captured pixel based on analysis of the collected electromagnetic radiation;

(b) creating a composite image of the scene by combining the data values from the plurality of images; and (c) determining a three-dimensional location for each pixel of the composite image based on analysis of the data values of each pixel of the composite image.

49. A method for acquiring three-dimensional range information of a scene, the method comprising:

(a) obtaining a plurality of images of a scene, wherein obtaining each of the images includes:

(i) generating non-spatially-patterned electromagnetic radiation that is reflected from target objects in the scene about which range information is desired;

(ii) collecting, using a sensor array of at least two dimensions, the reflected electromagnetic radiation, wherein an array of pixels is captured simultaneously and wherein focal length of at least one of the generated and collected electromagnetic radiation is changed at least once during the collecting; and (iii) determining a data value for each captured pixel based on analysis of the collected electromagnetic radiation;

(b) creating a composite image of the scene by combining the data values from the plurality of images; and (c) determining a three-dimensional location for each pixel of the composite image based on analysis of the data values of each pixel of the composite image.

50. A method for acquiring three-dimensional range information of a scene, the method comprising:

(a) obtaining a plurality of images of a scene, wherein obtaining each of the images includes:

(i) generating non-spatially-patterned electromagnetic radiation that is reflected from target objects in the scene about which range information is desired;

(ii) collecting, using a sensor array of at least two dimensions, the reflected electromagnetic radiation, wherein an array of pixels is captured simultaneously and wherein at least one of intensity of the generated electromagnetic radiation and exposure of the collected electromagnetic radiation is changed at least once during the collecting; and (iii) determining a data value for each captured pixel based on analysis of the collected electromagnetic radiation;

(b) creating a composite image of the scene by combining the data values from the plurality of images; and (c) determining a three-dimensional location for each pixel of the composite image based on analysis of the data values of each pixel of the composite image.

51. A system for acquiring three-dimensional range information of a scene, the system comprising:

(a) an electromagnetic radiation source for illuminating a scene about which range information is desire;

(b) a sensor array of at least two dimensions for collecting images of electromagnetic radiation generated by the electromagnetic radiation source and reflected from the scene, wherein each image includes an array of simultaneously captured pixels;

(c) a pixel image shifter for shifting the image of the scene on the sensor array to obtain a plurality of pixel-shifted images of the scene, wherein at least one of the pixel-shifted images is shifted by a non-integer pixel distance with respect to another of the pixel-shifted images; and (d) a processor for determining a data value for each captured pixel based on analysis of the collected electromagnetic radiation, for creating a super-resolution image by combining the data values from the plurality of pixel-shifted images, and for determining a three-dimensional location for each pixel of the super-resolution image based on analysis of the data values for each pixel of the super-resolution image.

52. The system of claim 51 comprising means for changing a zoom at which each of the pixel-shifted images is collected.

53. The system of claim 51 wherein the electromagnetic radiation source generates an electromagnetic radiation pulse.

54. The system of claim 51 wherein the processor determines the data value for each pixel by measuring time of flight of the electromagnetic radiation.

55. The system of claim 51 wherein the sensor array collects the electromagnetic radiation for a time interval and wherein the processor determines the data value for each pixel by measuring energy of the collected electromagnetic radiation.

56. The system of claim 55 including a shutter located between the sensor array and the scene for controlling collection of the electromagnetic radiation.

57. The system of claim 55 wherein the sensor array collects the electromagnetic radiation for a time interval sufficient for the electromagnetic radiation to reflect from a farthest object in the scene and return to the sensor array to be collected.

58. The system of claim 51 wherein:

(a) the electromagnetic radiation source generates amplitude-modulated electromagnetic radiation at an amplitude modulation frequency;

(b) the sensor array collects the amplitude-modulated electromagnetic radiation reflected from the scene; and (c) the processor determines the data value for each pixel based on analysis of the relative amplitude phase delay between the generated and collected amplitude-modulated electromagnetic radiation.

59. The system of claim 51 wherein:

(a) the electromagnetic radiation source generates amplitude-modulated electromagnetic radiation at a first amplitude modulation frequency and a second amplitude modulation frequency;

(b) the sensor array collects the amplitude-modulated electromagnetic radiation reflected from the scene; and (c) the processor determines a data value for each pixel based on analysis of the relative amplitude phase delay between the generated and collected amplitude-modulated electromagnetic radiation at the first and second amplitude modulation frequencies.

60. The system of claim 58 wherein the sensor array detects amplitude modulation phase of the collected amplitude-modulated electromagnetic radiation and provide the amplitude modulation phase to the processor.

61. The system of claim 51 wherein the electromagnetic radiation comprises visible light.

62. The system of claim 51 wherein the electromagnetic radiation comprises near-infrared electromagnetic radiation.

63. The system of claim 51 wherein the electromagnetic radiation comprises far-infrared electromagnetic radiation.

64. The system of claim 51 wherein the electromagnetic radiation source comprises a laser.

65. The system of claim 51 wherein the electromagnetic radiation source comprises a light emitting diode.

66. The system of claim 51 wherein the sensor array comprises a complementary metal oxide semiconductor (CMOS) sensor array.

67. The system of claim 51 wherein the sensor array comprises a charge-coupled device (CCD) sensor array.

68. The system of claim 51 wherein the sensor array comprises an avalanche photo diode (APD) sensor array.

69. The system of claim 51 wherein the sensor array comprises a color sensor array.

70. The system of claim 69 wherein the color sensor array comprises a red-green-blue (RGB) color sensor array.

71. The system of claim 51 wherein the pixel image shifter includes a lens and at least one actuator for moving the lens such that at least some of the images collected by the sensor array are shifted a non-integer pixel distance with respect to each other on the sensor array.

72. The system of claim 51 wherein the pixel image shifter includes at least one actuator for moving the sensor array such that at least some of the images collected by the sensor array are shifted a non-integer pixel distance with respect to each other on the sensor array.

73. The system of claim 51 wherein the pixel image shifter includes a lens and at least one actuator for moving the lens and the sensor array such that relative movement of the lens and the sensor array is such that at least some of the images collected by the sensor array are shifted by a non-integer pixel distance with respect to each other on the sensor array.

74. The system of claim 73 wherein the at least one actuator comprises a piezoelectric actuator.

75. The system of claim 51 wherein the processor applies an image processing function to at least one of the collected images and the super-resolution images to correct a range error.

76. The system of claim 75 wherein the image processing function includes at least one of a gamma adjustment function, a brightness adjustment function, a contrast adjustment function, and a color adjustment function to correct the range error.

77. The system of claim 51 wherein the processor applies a noise reduction algorithm to a plurality of images to reduce errors introduced by noise.

78. The system of claim 77 wherein the noise reduction algorithm comprises one of an averaging algorithm, a median filtering algorithm, a chirp demodulation algorithm, and a pseudo-noise demodulation algorithm.

79. The system of claim 51 wherein the processor corrects the data value for each captured pixel to compensate for range errors introduced by the sensor array.

80. The system of claim 79 wherein correcting the data value for each captured pixel to compensate for range errors includes, in response to detecting a non-functioning pixel in the sensor array, interpolating a value for the non-functioning pixel based on values of neighboring pixels.

81. The system of claim 51 wherein the processor corrects the data value for each captured pixel to compensate for range errors introduced by a lens aberration.

82. The system of claim 51 wherein the data value for each captured pixel comprises at least one of range of the scene, reflectivity of the scene, color of the scene, and temperature of the scene.

83. The system of claim 51 wherein the processor creates the super-resolution image using a super-resolution algorithm to combine the data values from the plurality of pixel-shifted images.

84. The system of claim 51 wherein combining the data values from the plurality of pixel-shifted images includes using a super-resolution algorithm to create the super-resolution image of the scene.

85. The system of claim 51 comprising means for controlling exposure of the pixel-shifted images onto the sensor array.

86. The system of claim 51 comprising means for controlling focal length of the pixel-shifted images onto the sensor array.

87. The system of claim 51 comprising means for controlling focus of the pixel-shifted images onto the sensor array.

88. The system of claim 51 comprising means for controlling intensity of the generated electromagnetic radiation.

89. The system of claim 51 comprising means for controlling focal length of the generated electromagnetic radiation.

90. The system of claim 51 comprising means for controlling focus of the generated electromagnetic radiation.

91. The system of claim 51 comprising:
  (a) a housing containing the sensor array and pixel image shifter;
  (b) an arm for supporting the housing, the arm including a first end pivotally coupled to the housing and a second end spaced from the first end; and
  (c) a stand for supporting the arm, the stand being pivotally coupled to the second end of the arm in a manner that allows the sensor array to obtain an unobstructed range image of a scene underneath the stand.

92. The system of claim 91 wherein the arm is adapted to pivot about the stand in a first direction and wherein the housing is adapted to pivot about the arm in a second direction angularly offset from the first direction.

93. The system of claim 51 wherein the three-dimensional location determined for each pixel includes a set of three-dimensional coordinates for each pixel of the super-resolution image.

94. The system of claim 93 wherein the three dimensional coordinates determined for each pixel includes at least one of Cartesian, polar, and spherical coordinates.

95. A system for acquiring three-dimensional range information of a scene, the system comprising:
a range camera having a housing, the housing including:
  (a) an electromagnetic radiation source for providing non-spatially-patterned illumination of a scene about which range information is desired;
  (b) a sensor array of at least two dimensions for collecting electromagnetic radiation generated by the electromagnetic radiation source and reflected from the scene, wherein an array of pixels is captured simultaneously;
  (c) a processor for determining a data value for each captured pixel based on analysis of the collected electromagnetic radiation, and for determining the three-dimensional location for each captured pixel based on analysis of the data values of each captured pixel; and
  (d) a storage device for storing at least one of the data value for each captured pixel and the range value for each captured pixel.

96. A system for acquiring three-dimensional range information of a scene, the system comprising:
a range camera having a housing, the housing including:
  (a) an electromagnetic radiation source for providing non-spatially-patterned illumination of a scene about which range information is desired;
  (b) a sensor array of at least two dimensions for collecting electromagnetic radiation generated by the electromagnetic radiation source and reflected from the scene, wherein an array of pixels is captured simultaneously; and
  (c) a processor for determining a data value for each captured pixel based on analysis of the collected electromagnetic radiation, for determining the three-dimensional location for each captured pixel based on analysis of the data values of each captured pixel, and for performing at least one of geometric and radiometric corrections to the range value for each captured pixel.

97. A system for acquiring three-dimensional range information of a scene, the system comprising:
a range camera having a housing, the housing including:
  (a) an electromagnetic radiation source for providing non-spatially-patterned illumination of a scene about which range information is desired;
  (b) a sensor array of at least two dimensions for collecting electromagnetic radiation generated by the electromagnetic radiation source and reflected from the scene, wherein an array of pixels is captured simultaneously; and
  (c) a processor for determining a data value for each captured pixel based on analysis of the collected electromagnetic radiation, for applying noise reduction algorithms to the data values for each captured pixel for reducing error introduced by noise, and for determining the three-dimensional location for each captured pixel based on analysis of the data values of each captured pixel.

98. A system for acquiring three-dimensional range information of a scene, the system comprising:
a range camera having a housing, the housing including:
  (a) an electromagnetic radiation source for providing non-spatially-patterned illumination of a scene about which range information is desired;
  (b) a sensor array of at least two dimensions for collecting electromagnetic radiation generated by the electromagnetic radiation source and reflected from the scene, wherein an array of pixels is captured simultaneously;
  (c) a processor for determining a data value for each captured pixel based on analysis of the collected electromagnetic radiation, and for determining the three-dimensional location for each captured pixel based on analysis of the data values of each captured pixel; and
    (d) a display device for displaying at least one of the data value for each captured pixel, the range value for each captured pixel, the color value for each captured pixel, and the temperature value of each captured pixel.

99. A system for acquiring three-dimensional range information of a scene, the system comprising:
a range camera having a housing, the housing including:
    (a) an electromagnetic radiation source for providing non-spatially-patterned illumination of a scene about which range information is desired;
    (b) a sensor array of at least two dimensions for collecting electromagnetic radiation generated by the electromagnetic radiation source and reflected from the scene, wherein an array of pixels is captured simultaneously;
    (c) a processor for determining a range value for each captured pixel based on analysis of the collected electromagnetic radiation; and
    (d) a user interface for controlling at least one of generation, collection, and analysis of the electromagnetic radiation.

100. A system for acquiring color and three-dimensional range information of a scene, the system comprising:
a range camera having a housing, the housing including:
    (a) an electromagnetic radiation source for providing non-spatially-patterned illumination of a scene about which range information is desired;
    (b) a range sensor array of at least two dimensions for collecting electromagnetic radiation generated by the electromagnetic radiation source and reflected from the scene, wherein an array of range pixels is captured simultaneously;
    (c) a color sensor array of at least two dimensions for collecting electromagnetic radiation from the scene, wherein an array of color pixels is captured simultaneously; and
    (d) a processor for determining a three-dimensional location for each captured range pixel based on analysis of the captured range pixels and for determining a color value for each captured color pixel based on analysis of the captured color pixels.

101. A system for acquiring three-dimensional range information of a scene, the system comprising:
    (a) a range camera having a housing, the housing including:
        (i) an electromagnetic radiation source for illuminating a scene about which range information is desired;
        (ii) a sensor array of at least two dimensions for collecting electromagnetic radiation generated by the electromagnetic radiation source and reflected from the scene, wherein an array of pixels is captured simultaneously; and
        (iii) a processor for determining a range value for each captured pixel based on analysis of the collected electromagnetic radiation; and
    (b) a mount for supporting the housing, the mount including at least one actuator controllable by the processor to control movement of the housing, thereby controlling at least one of azimuth and elevation of the range camera.

102. A system for acquiring three-dimensional range information of a scene, the system comprising:
a range camera having a housing, the housing including:
    (a) an electromagnetic radiation source for providing non-spatially-patterned illumination of a scene about which range information is desired;
    (b) a sensor array of at least two dimensions for collecting electromagnetic radiation generated by the electromagnetic radiation source and reflected from the scene, wherein an array of pixels is captured simultaneously;
    (c) means for controlling exposure of the sensor array to the reflected electromagnetic radiation; and
    (d) a processor for determining a range value for each captured pixel based on analysis of the collected electromagnetic radiation.

103. A system for acquiring three-dimensional range information of a scene, the system comprising:
a range camera having a housing, the housing including:
    (a) an electromagnetic radiation source for providing non-spatially-patterned illumination of a scene about which range information is desired;
    (b) a sensor array of at least two dimensions for collecting electromagnetic radiation generated by the electromagnetic radiation source and reflected from the scene, wherein an array of pixels is captured simultaneously;
    (c) means for controlling the focus of the collected electromagnetic radiation onto the sensor array; and
    (d) a processor for determining a range value for each captured pixel based on analysis of the collected electromagnetic radiation.

104. A system for acquiring three-dimensional range information of a scene, the system comprising:
a range camera having a housing, the housing including:
    (a) an electromagnetic radiation source for providing non-spatially-patterned illumination of a scene about which range information is desired;
    (b) a sensor array of at least two dimensions for collecting electromagnetic radiation generated by the electromagnetic radiation source and reflected from the scene, wherein an array of pixels is captured simultaneously;
    (c) means for controlling focal length of the collected electromagnetic radiation; and
    (d) a processor for determining a range value for each captured pixel based on analysis of the collected electromagnetic radiation.

105. A system for acquiring three-dimensional range information of a scene, the system comprising:
a range camera having a housing, the housing including:
    (a) an electromagnetic radiation source for providing non-spatially-patterned illumination of a scene about which range information is desired;
    (b) a sensor array of at least two dimensions for collecting electromagnetic radiation generated by the electromagnetic radiation source and reflected from the scene, wherein an array of pixels is captured simultaneously;
    (c) means for controlling intensity of the illumination generated by the electromagnetic radiation source; and
    (d) a processor for determining a range value for each captured pixel based on analysis of the collected electromagnetic radiation.

106. A system for acquiring three-dimensional range information of a scene, the system comprising:
a range camera having a housing, the housing including:
    (a) an electromagnetic radiation source for providing non-spatially-patterned illumination of a scene about which range information is desired;
    (b) a sensor array of at least two dimensions for collecting electromagnetic radiation generated by the electromagnetic radiation source and reflected from the scene, wherein an array of pixels is captured simultaneously;
    (c) means for controlling the focus of the illumination generated by the electromagnetic radiation source; and
    (d) a processor for determining a range value for each captured pixel based on analysis of the collected electromagnetic radiation.

107. A system for acquiring three-dimensional range information of a scene, the system comprising:

a range camera having a housing, the housing including:
  (a) an electromagnetic radiation source for providing non-spatially-patterned illumination of a scene about which range information is desired;
  (b) a sensor array of at least two dimensions for collecting electromagnetic radiation generated by the electromagnetic radiation source and reflected from the scene, wherein an array of pixels is captured simultaneously;
  (c) means for controlling focal length of the illumination generated by the electromagnetic radiation source; and
  (d) a processor for determining a range value for each captured pixel based on analysis of the collected electromagnetic radiation.

108. A computer program product comprising computer executable instructions embodied in a computer readable medium for performing steps comprising:
  (a) obtaining a plurality of pixel-shifted images of a scene, at least one of the images being shifted by a non-integer pixel value with respect to another of the images, wherein obtaining each of the pixel-shifted images includes:
    (i) generating electromagnetic radiation that is reflected from target objects in the scene about which range information is desired;
    (ii) collecting, using a sensor array of at least two dimensions, images of the reflected electromagnetic radiation, wherein each image includes an array of simultaneously-captured pixels; and
    (iii) determining a data value for each captured pixel based on analysis of the collected electromagnetic radiation;
  (b) creating a super-resolution image of the scene by combining the data values from the plurality of pixel-shifted images; and
  (c) determining a three-dimensional location for each pixel of the super-resolution image based on analysis of the data values of the super-resolution image.

* * * * *